UNITED STATES PATENT OFFICE.

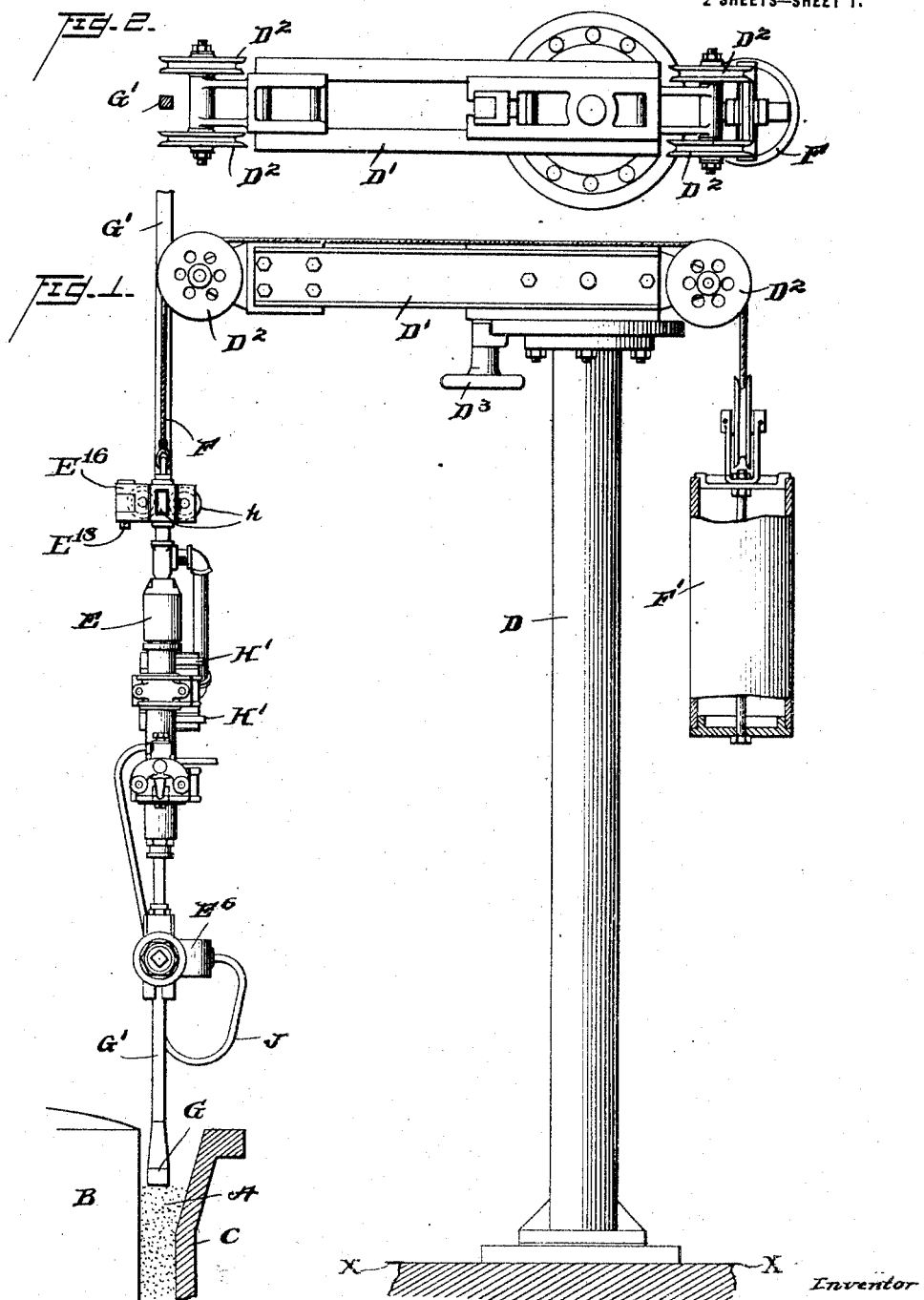

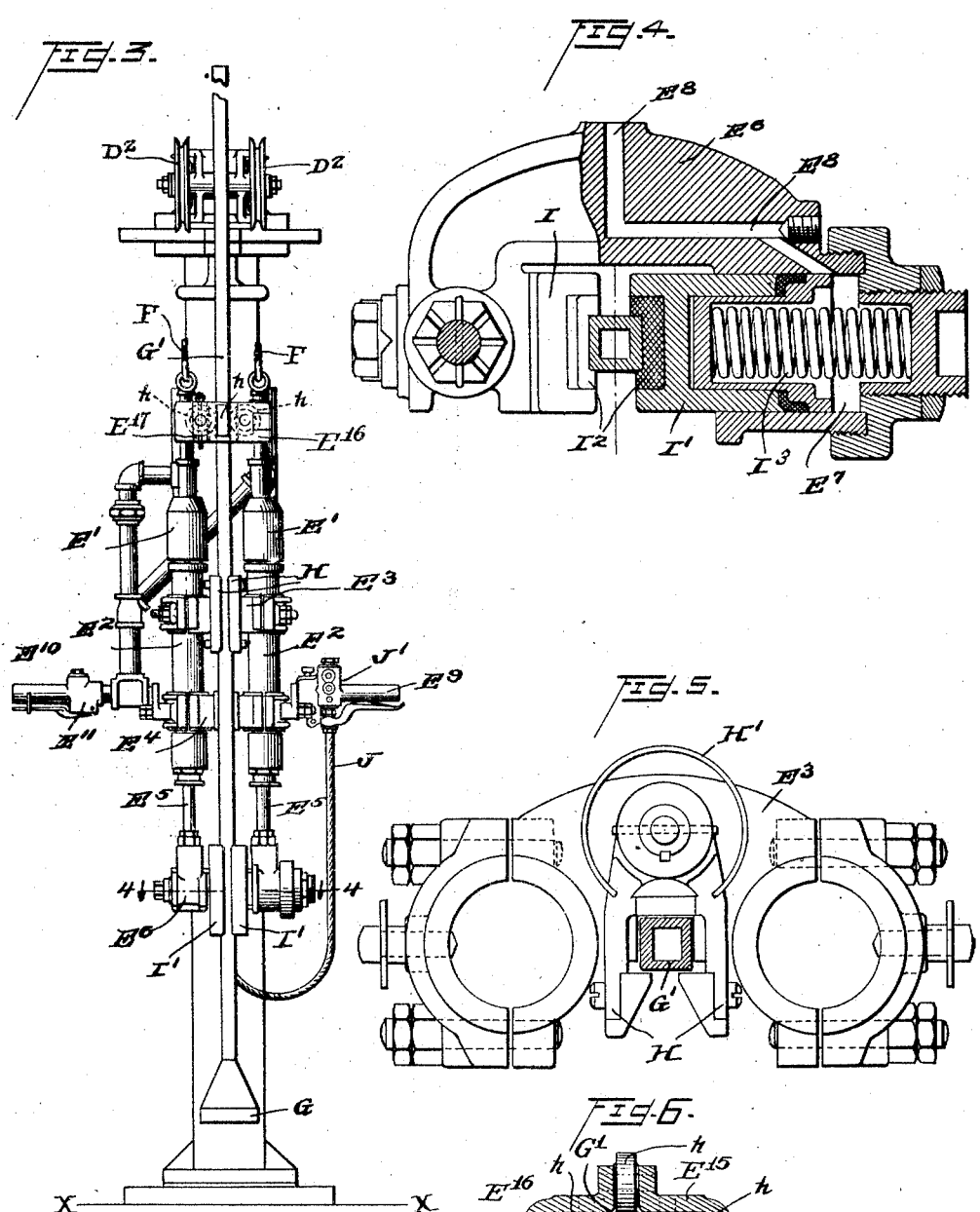

THOMAS P. ANTHONY, OF EDGEWATER PARK, NEW JERSEY, ASSIGNOR TO UNITED STATES CAST IRON PIPE AND FOUNDRY COMPANY, OF BURLINGTON, NEW JERSEY, A CORPORATION OF NEW JERSEY.

PNEUMATIC RAMMER.

1,367,001.   Specification of Letters Patent.   Patented Feb. 1, 1921.

Application filed March 4, 1918. Serial No. 220,351.

*To all whom it may concern:*

Be it known that I, THOMAS P. ANTHONY, a citizen of the United States of America, and resident of Edgewater Park, in the county of Burlington and State of New Jersey, have invented a certain new and useful Improvement in Pneumatic Rammers, of which the following is a true and exact description, reference being had to the accompanying drawings, which form a part thereof.

My present invention consists in improved mold ramming mechanism particularly devised and adapted for use in forming the molds in which large pipes or analogous tubular bodies are to be cast, though not restricted to such use. The general object of the invention is to provide improved mechanism for use in progressively ramming or tamping a mold.

The various features of novelty which characterize my invention are pointed out with particularity in the claims annexed hereto and forming a part of this specification. For a better understanding of the invention, however, and the advantages possessed by it, reference should be had to the accompanying drawings and descriptive matter in which I have illustrated a preferred embodiment of my invention.

Of the drawings:

Figure 1 is an elevation of the complete ramming apparatus with a portion of the mold, shown partly in section.

Fig. 2 is a plan view of the apparatus shown in Fig. 1.

Fig. 3 is an elevation taken at right angles to Fig. 1.

Fig. 4 is a plan view of a portion of the rammer guiding and gripping mechanism, the view being partly in section.

Fig. 5 is a plan view of another portion of the rammer guiding mechanism, the rammer stem being shown in section, and Fig. 6 is a plan view of still another portion of the rammer guiding mechanism with the supporting frame and rammer stem shown in section.

The apparatus is shown in the drawing in position for use in compacting sand or other mold forming material A about a vertical pattern B in a flask C. The mold forming material is compacted by a reciprocating rammer or tamping device G, which is operated by a fluid pressure actuating mechanism E having its reciprocating element connected to the tamping device by a clutch mechanism hereinafter described more in detail, which permits an upward movement of the tamping device relative to the actuating mechanism as the mold is progressively filled and tamped so that the actuating mechanism may remain at the same, or approximately the same level throughout the mold forming operation. The ramming mechanism is adapted to be operated and controlled by a workman standing on a floor or platform level indicated by the line XX. The ramming mechanism is supported from a column D at the side of the mold. The column D is provided at its upper end with a swinging crane arm $D'$, $D^3$ representing a clamping device for securing the arm $D'$ in any desired angular adjustment about the axis of the column D. The arm $D'$ is provided with pulleys $D^2$ at its ends over which runs a cable or other flexible supporting device F, which connects the actuating mechanism E to a counter weight $F'$, substantially counterbalancing the weight of the actuating mechanism.

The actuating mechanism in the preferred construction illustrated comprises a pair of cylinders $E'$, which with the pistons working therein and the controlling valve mechanism therefor may be similar in character and general dimensions to a pair of pneumatic hammers such as are employed in metal riveting and chipping. $E^2$ represents cylindrical extensions from the cylinders $E'$ rigidly secured to the latter and forming guides for the piston rods $E^5$ of the two cylinders. The cylinder extensions $E^2$ are rigidly connected together by cross heads $E^3$ and $E^4$. The piston rods $E^5$ are rigidly connected at their lower ends to a cross head $E^6$. The rammer G is provided with a stem $G'$ which passes between guides H and $h$, carried by the cross heads $E^3$ and $E^{15}$ respectively, and between gripping jaws I and $I'$ carried by the cross head $E^6$. As shown, the guides H are in the form of opposing pivoted jaws notched to embrace the stem $G'$. A curved spring $H'$, which is connected at one end to one of the jaws H, and at the other end to the other jaw H, normally holds the jaws H in their normal stem guiding relation, while permitting the jaws to be spread apart when it is desired to remove the stem in making adjustments or repairs. The guides h are rollers mounted in the cross head E¹⁵, which is secured to posts E¹⁶, projecting upward from the tops of the cylinders E'. To facilitate the lateral removal of the stem G', the front roller is mounted in an arm E¹⁷, pivotally connected at E¹⁸ to the body portion of the cross head E¹⁵, and normally secured in the position shown in Fig. 6 by a cotter pin E¹⁹.

The gripping jaw I is rigidly secured to the cross head E⁶, but the gripping jaw I' is formed with a trunk piston like extension working in a cylinder space E⁷ formed in the cross head E⁶. The jaws I and I' are faced with suitable contact material such as compressed fiber. A spring I³, acting against the inner end of the sliding jaw I', tends to force the jaw I' against the coöperating jaw I and thus cause the jaws I and I' to exert a gripping pressure on the opposite sides of the rammer stem G'. The gripping action of the jaws I and I' may be augmented by the admission of air or other pressure fluid to the cylinder E⁷ through the ports E⁸. J represents a flexible hose having one end connected to the outer end of the port E⁸ and having its other end connected to the outlet port of the valve J', which is secured to or forms a part of a handle E⁹ secured to one end of the cross head E⁴. A handle E¹⁰ secured to the opposite end of the cross head E⁴ is provided with a valve E¹¹ for supplying air to the pneumatic cylinders E'.

The handles E⁹ and E¹⁰ are conveniently disposed so as to be grasped by the two hands of an operator standing on the platform at level XX. By manipulating the valves J' and E¹¹, the operator can thus readily control both the operation of the pneumatic cylinders E' and the pressure with which the jaws I and I' grip the rammer stem G'.

In operation the sand or other mold forming material is fed into the mold and rammed by the reciprocation of the rammer G, suitable means, not shown, being provided for rotating the mold C as the ramming operation proceeds. As the mold progressively fills up with compacted material, the rammer G must be correspondingly elevated with respect to its actuating mechanism E, if the latter is to remain at the same, or practically the same level throughout the ramming operation. This is accomplished with the mechanism disclosed by permitting a regulated slippage of the rammer stem G' through the clamping jaws I and I'. As the cross head E⁶ with the clamping jaws I and I' is raised and lowered, the jaws I and I' tend to carry with them the rammer G by reason of the frictional engagement of the jaws with the stem of the rammer. The compacting effect of the rammer G on the mold forming material is regulated by the pressure with which the jaws I and I' grip the rammer stem. With my practical gripping pressure of the jaws I and I', as the mold is progressively filled and tamped, a mold density is quickly reached in normal operation, at which the rammer G, on each downward blow, is arrested by the mold forming material slightly before the jaws I and I' complete their downward stroke. The slippage of the rammer stem G' through the jaws I and I' thus produced corresponds to the rate at which the mold is filled with compacted material. By increasing the fluid pressure in the outer end of the cylinder E⁷ the density of the compacted mold may be increased, and by decreasing this pressure a mold less densely compacted is produced. In the practical use of the apparatus the operator quickly learns to tell from the slight shock transmitted to his hands through the handles E⁹ and E¹⁰ of the actuating mechanism just how densely the mold is being compacted, and is thus in position to manipulate the valve J' as required to produce the desired mold density. To permit of a sensitive and accurate control of the ramming blow the weight, and consequently the inertia, of the rammer stem should be made relatively low, and for this reason we preferably form the stem G' of the rammer of aluminum or other light weight material. The operator may readily raise and lower and laterally adjust the suspended actuating mechanism E, and thereby the rammer G by means of the handles E⁹ and E¹⁰. The crane arm D' may be swung to one side to carry the actuating mechanism E laterally away from the mold when this is desirable. The use of two pneumatic actuating cylinders rather than one possesses the advantage that it is somewhat easier to balance the parts supported by the pistons, and the latter with their piston rods are less apt to bind against their guides.

While in accordance with the provisions of the statutes I have illustrated and described the best form of my invention now known to me, it will be apparent to those skilled in the art that changes may be made in the form of my invention without departing from its spirit, and that some features of my invention may sometimes be used to advantage without a corresponding use of other features of the invention.

Having now described my invention, what I claim as new and desire to secure by Letters Patent, is:

1. A mold ramming device comprising in combination a vertically reciprocating actuating mechanism provided with a pneumatic clutch, means for adjusting the clutch pressure while the mechanism is being reciprocated and a rammer yieldingly gripped by the clutch.

2. A mold ramming device comprising in combination a vertically adjustable suspended motor including a vertically reciprocating element, a clutch carried thereby and a rammer yieldingly gripped by said clutch.

3. A mold ramming device comprising in combination a vertically and laterally adjustable motor, including a vertically reciprocating element, a clutch carried by said element and a rammer yieldingly gripped thereby.

4. A mold ramming device comprising in combination a vertically reciprocating actuating element, a friction clutch carried thereby, a rammer yieldingly gripped by said clutch and pneumatic means for adjusting the clutch pressure.

5. A mold ramming device comprising a suspended fluid pressure motor provided with guide handles and including a vertically reciprocating element, a clutch carried thereby, a rammer yieldingly gripped by said clutch, valve mechanism associated with said handles for controlling the fluid pressure motor and the pressure with which said clutch grips the rammer.

6. A mold ramming device comprising a suspended fluid pressure motor provided with guide handles and including a vertically reciprocating element, a clutch carried thereby, a rammer yieldingly gripped by said clutch, separate valve mechanisms associated with said handles for controlling the fluid pressure motor and the pressure with which said clutch grips the rammer.

7. A mold ramming device comprising in combination a vertically reciprocating element, a clutch carried thereby, a rammer having a stem yieldingly gripped by said clutch, and guides separate from the clutch for said stem, and separable from one another to permit the lateral removal of the stem.

8. Pipe molding mechanism comprising in combination a column, a crane arm revolubly mounted thereon and provided with pulleys, a motor, a counter balance, and a flexible connection between said motor and said counter balance running over said pulleys, said motor comprising a vertically reciprocating element, a clutch carried by said element and a rammer yieldingly gripped by said clutch.

9. Pipe molding mechanism comprising in combination a column, a crane arm revolubly mounted thereon, a vertically adjustable counter balanced motor suspended from said crane arm and comprising a vertically reciprocating element, a clutch carried by said element and a rammer yieldingly gripped by said clutch.

10. A mold ramming device comprising a pair of vertical fluid pressure motor cylinders rigidly secured together, with piston rods projecting from the lower ends of said cylinders, a friction clutch including coöperating clutch elements and fluid pressure means for regulating the clutch pressure carried by the lower ends of said stems, a valve mounted on said cylinders, a flexible conduit connecting said valve to said fluid pressure means.

11. A mold ramming device comprising a pair of vertical fluid pressure motor cylinders rigidly secured together, with piston rods projecting from the lower ends of said cylinders, a friction clutch including coöperating clutch elements and fluid pressure means for regulating the clutch pressure carried by the lower ends of said stems, a valve mounted on said cylinders, a flexible conduit connecting said valve to said fluid pressure means, a second valve mounted on cylinders and controlling the operation thereof, and adjustable supporting means for said cylinders.

12. A mold ramming device comprising a pair of vertical fluid pressure motor cylinders rigidly secured together, with piston rods projecting from the lower ends of said cylinders, a friction clutch including coöperating clutch elements and fluid pressure means for regulating the clutch pressure carried by the lower ends of said stems, a valve mounted on said cylinders, a flexible conduit running from said valve to said fluid pressure means and a flexible suspension for said cylinders.

THOMAS P. ANTHONY.